(12) United States Patent
Jiang et al.

(10) Patent No.: US 10,821,869 B2
(45) Date of Patent: Nov. 3, 2020

(54) HEADREST ASSEMBLY

(71) Applicant: Daimay North America Automotive, Inc., Redford, MI (US)

(72) Inventors: Yingtai Jiang, Shanghai (CN); Jianhua Wang, Novi, MI (US); Guojun Tang, Zhoushan (CN)

(73) Assignee: DAIMAY NORTH AMERICA AUTOMOTIVE, INC., Redford, MI (US)

( * ) Notice: Subject to any disclaimer, the term of this patent is extended or adjusted under 35 U.S.C. 154(b) by 0 days.

(21) Appl. No.: 15/738,001

(22) PCT Filed: Oct. 27, 2016

(86) PCT No.: PCT/CN2016/103544
§ 371 (c)(1),
(2) Date: Dec. 19, 2017

(87) PCT Pub. No.: WO2018/076230
PCT Pub. Date: May 3, 2018

(65) Prior Publication Data
US 2020/0031262 A1    Jan. 30, 2020

(51) Int. Cl.
*B60N 2/815* (2018.01)
*B60N 2/818* (2018.01)
*B60N 2/865* (2018.01)

(52) U.S. Cl.
CPC ............. *B60N 2/815* (2018.02); *B60N 2/818* (2018.02); *B60N 2/865* (2018.02)

(58) Field of Classification Search
CPC ......... B60N 2/815; B60N 2/818; B60N 2/865
See application file for complete search history.

(56) References Cited

U.S. PATENT DOCUMENTS

| 7,044,555 B2 | 5/2006 | Saberan |
| 7,517,009 B2 | 4/2009 | Mauro et al. |
| 8,182,037 B2 | 5/2012 | Jeong et al. |

(Continued)

FOREIGN PATENT DOCUMENTS

| CN | 102700442 A | 10/2012 |
| CN | 204136826 U | 2/2015 |

(Continued)

OTHER PUBLICATIONS

International Search Report and Written Opinion for PCT Application PCT/CN2016/103544 dated Jul. 25, 2017.

*Primary Examiner* — David R Dunn
*Assistant Examiner* — Tania Abraham
(74) *Attorney, Agent, or Firm* — Carlson, Gaskey & Olds, P.C.

(57) ABSTRACT

A headrest assembly according to an exemplary aspect of the present disclosure includes, among other things, a rod configured to connect the headrest assembly to a seat back. The rod includes a first vertical portion and a second vertical portion, which each have a plurality of recesses. The headrest assembly further includes a head restraint including a pushing plate having a first locking portion and a second locking portion. The first and second locking portions selectively engage the recesses of the first and second vertical portions, respectively, to adjust a vertical position of the head restraint.

20 Claims, 2 Drawing Sheets

(56) References Cited

U.S. PATENT DOCUMENTS

| | | | | |
|---|---|---|---|---|
| 8,303,039 B2* | 11/2012 | Mueller | ............ | B60N 2/865 297/410 |
| 8,950,815 B2* | 2/2015 | Wang | ............ | B60N 2/809 297/410 |
| 2006/0250017 A1* | 11/2006 | Otto | ............ | B60N 2/888 297/410 |
| 2014/0145489 A1 | 5/2014 | Wang et al. | | |

FOREIGN PATENT DOCUMENTS

| | | |
|---|---|---|
| CN | 204564414 U | 8/2015 |
| CN | 105102264 A | 11/2015 |
| WO | 2013081404 A1 | 6/2013 |

\* cited by examiner

HEADREST ASSEMBLY

BACKGROUND

This disclosure relates to a headrest assembly for a seat in a vehicle.

Headrests are configured to be positioned relative to the back of an occupant's head and neck. Known headrests can be vertically adjusted by raising and lowering a head restraint to accommodate occupants of different heights.

Some known headrest assemblies include a rod having two vertical portions, and further include dedicated locks relative to each vertical portion. In order to adjust the position of the headrest, an occupant is required to activate both locks simultaneously, which requires use of both of the occupant's hands.

SUMMARY

A headrest assembly according to an exemplary aspect of the present disclosure includes, among other things, a rod configured to connect the headrest assembly to a seat back. The rod includes a first vertical portion and a second vertical portion, which each have a plurality of recesses. The headrest assembly further includes a head restraint including a pushing plate having a first locking portion and a second locking portion. The first and second locking portions selectively engage the recesses of the first and second vertical portions, respectively, to adjust a vertical position of the head restraint.

In a further non-limiting embodiment of the foregoing headrest assembly, the head restraint includes a push button configured to move the pushing plate when depressed.

In a further non-limiting embodiment of any of the foregoing headrest assemblies, the pushing plate is moveable between an engaged position and a disengaged position by the push button.

In a further non-limiting embodiment of any of the foregoing headrest assemblies, in the engaged position, the first and second locking portions are engaged with the recesses of the first and second vertical portions to prevent a vertical adjustment of the head restraint.

In a further non-limiting embodiment of any of the foregoing headrest assemblies, in the disengaged position, the first and second locking portions are disengaged from the recesses of the first and second vertical portions to permit vertical adjustment of the head restraint.

In a further non-limiting embodiment of any of the foregoing headrest assemblies, the pushing plate is moveable in a direction substantially perpendicular to the first and second vertical portions of the rod by the push button.

In a further non-limiting embodiment of any of the foregoing headrest assemblies, the pushing plate is biased toward the engaged position.

In a further non-limiting embodiment of any of the foregoing headrest assemblies, the first and second locking portions are provided by first and second locking plates, respectively.

In a further non-limiting embodiment of any of the foregoing headrest assemblies, the first and second locking portions are carried by the pushing plate.

In a further non-limiting embodiment of any of the foregoing headrest assemblies, the head restraint includes a plurality of springs configured to urge the pushing plate to the engaged position.

In a further non-limiting embodiment of any of the foregoing headrest assemblies, the head restraint includes a first cover and a second cover, the first and second covers are connected together and provide an interior space, and the pushing plate is provided entirely in the interior space.

In a further non-limiting embodiment of any of the foregoing headrest assemblies, the first cover and the second cover support a cushion and an encasement.

A seat for a motor vehicle according to an exemplary aspect of the present disclosure includes, among other things, a seat back and a headrest assembly. The headrest assembly includes, among other things, a rod configured to connect the headrest assembly to a seat back. The rod includes a first vertical portion and a second vertical portion, which each have a plurality of recesses. The headrest assembly further includes a head restraint including a pushing plate having a first locking portion and a second locking portion. The first and second locking portions selectively engage the recesses of the first and second vertical portions, respectively, to adjust a vertical position of the head restraint.

In a further non-limiting embodiment of the foregoing seat, the head restraint includes a push button configured to move the pushing plate when depressed, the pushing plate is moveable in a direction substantially perpendicular to the first and second vertical portions by the push button, and the pushing plate is biased toward the engaged position.

In a further non-limiting embodiment of any of the foregoing seats, the pushing plate is moveable between an engaged position and a disengaged position by the push button.

In a further non-limiting embodiment of any of the foregoing seats, in the engaged position, the first and second locking portions are engaged with the recesses of the first and second vertical portions to prevent vertical adjustment of the head restraint, and in the disengaged position, the first and second locking portions are disengaged from the recesses of the first and second vertical portions to permit vertical adjustment of the head restraint.

In a further non-limiting embodiment of any of the foregoing seats, the first and second locking portions are provided by first and second locking plates, respectively.

In a further non-limiting embodiment of any of the foregoing seats, the head restraint includes a plurality of springs configured to urge the pushing plate to the engaged position.

In a further non-limiting embodiment of any of the foregoing seats, the head restraint includes a first cover and a second cover, wherein the first and second covers are connected together and provide an interior space therebetween, and wherein the pushing plate is provided entirely in the interior space.

In a further non-limiting embodiment of any of the foregoing seats, the first cover and the second cover support a cushion and an encasement.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure generally relates to a headrest assembly for a seat in a vehicle. In one example of the present disclosure, the headrest assembly includes a head restraint having a vertically adjustable position relative to a seat back. The head restraint includes a pushing plate, which includes first and second locking portions configured to selectively engage respective recesses.

Providing the first and second locking portions on a common pushing plate allows an occupant to adjust the vertical position of the head restraint relatively easily by depressing a single button. The occupant can depress the button using a single finger from one hand, for example, which frees the occupant's other hand to adjust the vertical position of the headrest assembly. In some instances, the occupant can adjust the headrest assembly without needing to turn around and face the headrest assembly. That is, the occupant can reach over his or her shoulders while still facing forward to make the adjustment. The disclosed arrangement also provides a simplified head restraint, which reduces cost and increases manufacturability.

Figure 1:
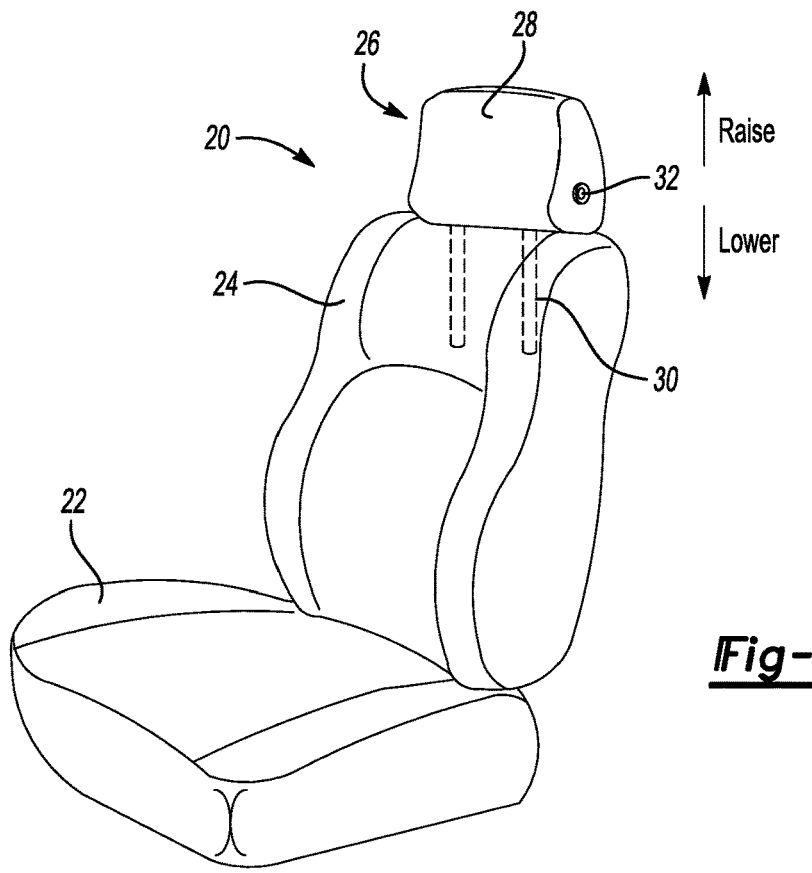
FIG. 1 is a perspective view of an example seat including an example headrest assembly.

FIG. 1 illustrates an example seat 20 for a motor vehicle. The seat 20 in this example includes a base 22, a seat back 24, and a headrest assembly 26. The headrest assembly 26 includes a head restraint 28 and a rod 30. The rod 30 may be provided by a single, bent piece of material, or separately formed elements that have been connected together. In this example, the head restraint 28 is vertically adjustable relative to the seat back 24 along the rod 30 in a "raise" direction and a "lower" direction. In this example, the head restraint 28 includes a push button 32 which, when depressed, allows adjustment of the head restraint. While a push button 32 is discussed herein, other activation devices come within the scope of this disclosure.

The "raise" and "lower" directions are labeled in FIG. 1 for ease of reference. However, the terms "raise" and "lower" are used for purposes of explanation only and should not be otherwise considered limiting. Similarly, the term "vertical" should not be considered limiting. In this disclosure, the terms "raise" and "lower" are used with reference to the position of the head restraint 28 relative to the seat back 24, and the term "vertical" is used relative to the normal, upright position of the seat 20.

Figure 2:
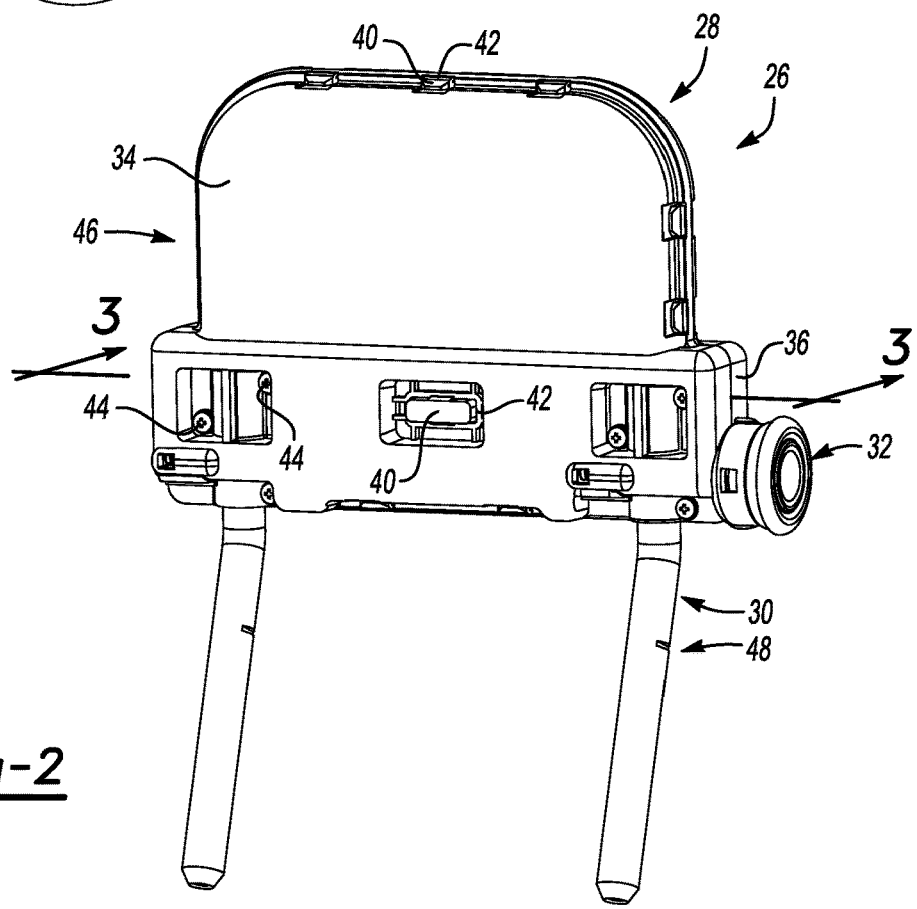
FIG. 2 is a perspective view of an example headrest assembly.

FIG. 2 illustrates the headrest assembly 26 without any padding or covering attached to the head restraint 28. The headrest assembly 26 in this example includes a first cover 34 and a second cover 36. The first and second covers 34, 36 are connected together and define an interior space 38 (FIG. 3) between the covers 34, 36. The first cover 34 in this example is a front cover configured to face the rear of an occupant's head and/or neck when in use. The second cover 36 is a rear cover. The first and second covers 34, 36 are connected together by a plurality of latches 40, which project from the second cover 36 and are received in corresponding recesses 42 of the first cover 34. Further, there are a plurality of fasteners 44 connecting the first and second covers 34, 36.

While not illustrated in FIG. 2, the first and second covers 34, 36 are configured to support a cushion and an encasement. In FIG. 1 the head restraint 28 supports a cushion, which may include foam encased in fabric, such as leather or cloth.

The rod 30 includes an upper portion 46 surrounded by the first and second covers 34, 36 and received in the interior space 38, and a lower portion 48 configured to couple to the seat back 24. The rod 30 is generally configured to remain fixed relative to the seat back 24. The head restraint 28 is configured to selectively move along the rod 30 in the "raise" and "lower" directions when the push button 32 is depressed. The push button 32 is support by at least one of the first and second covers 34, 36.

Figure 3:
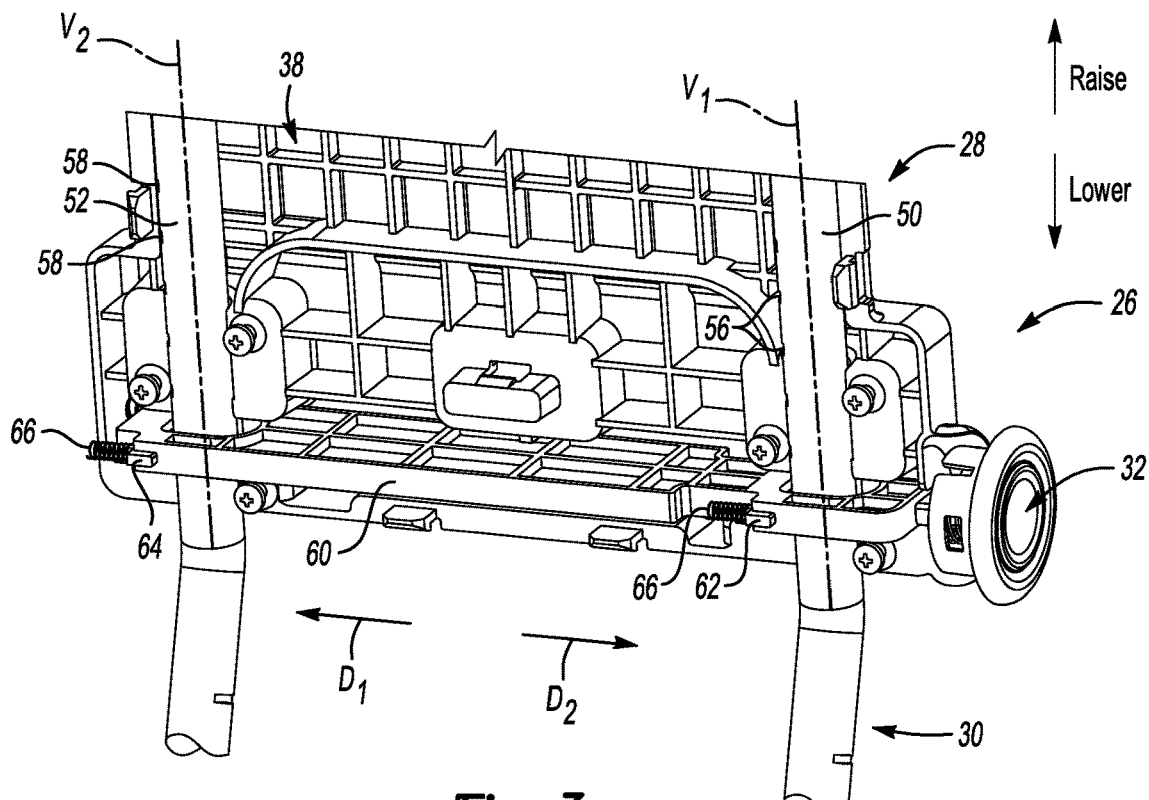
FIG. 3 is a cross-sectional view of the example headrest assembly taken along line 3-3 from FIG. 2.

FIG. 3 is a cross-sectional view taken along line 3-3 of FIG. 2 and illustrates the detail of the interior space 38. FIG. 3 illustrates, in particular, an example arrangement providing selective adjustment of the head restraint 28 relative to the rod 30.

As shown in FIG. 3, the rod 30 includes a first vertical portion 50 and a second vertical portion 52. The first and second vertical portions 50, 52 are arranged generally along first and second vertical axes $V_1$, $V_2$, and are spaced-apart by a horizontal portion of the rod 30, which is not shown. The first and second vertical portions 50, 52 each have a plurality of recesses 56, 58. The recesses 56, 58 in this example are in the form of notches or slots formed on an outer surface of the first and second vertical portions 50, 52, respectively.

In this example, the head restraint 28 includes a pushing plate 60 having a first locking portion 62 and a second locking portion 64. In this example, the pushing plate 60 is a single structure including, or supporting, the first and second locking portions 62, 64. In one example, the first and second locking portions 62, 64 are separate structures connected to the pushing plate 60, and in another example the first and second locking portions 62, 64 are integrally formed with the pushing plate 60. In one particular example, the pushing plate 60 is formed of a single piece of plastic material, and the first and second locking portions are provided from metallic material. The first and second locking portions 62, 64 are configured to selectively engage the recesses 56, 58 of the first and second vertical portions 50, 52, respectively, to adjust a vertical position of the head restraint 28.

In this example, the pushing plate 60 is configured to move in a horizontal direction between an engaged position and a disengaged position by the push button 32. In FIG. 2, the directions $D_1$, $D_2$ are in the horizontal direction and are substantially perpendicular to the axes $V_1$, $V_2$ of the vertical portions 50, 52 of the rod 30.

In this example, the pushing plate 60 is biased toward the engaged position by a plurality of biasing elements 66. In the engaged position, the first and second locking portions 62, 64 are received in the recesses 56, 58 under the force of the biasing elements 66, which urge the pushing plate 60 in the direction $D_2$, such that vertical adjustment of the head restraint 28 is prevented. When the push button 32 is depressed such that the force of the biasing elements 66 is overcome, the push plate 60 moves in the direction $D_1$ to the disengaged position. In this position, the locking portions 62, 64 are not received in the recesses 56, 58, which allows vertical adjustment of the head restraint 28 in the "raise" and "lower" directions. When the vertical position of the head restraint 28 is set, the occupant releases the push button 32, and the biasing elements 66 urge the push plate 60 in the direction $D_2$ back to the engaged position.

Figure 4:
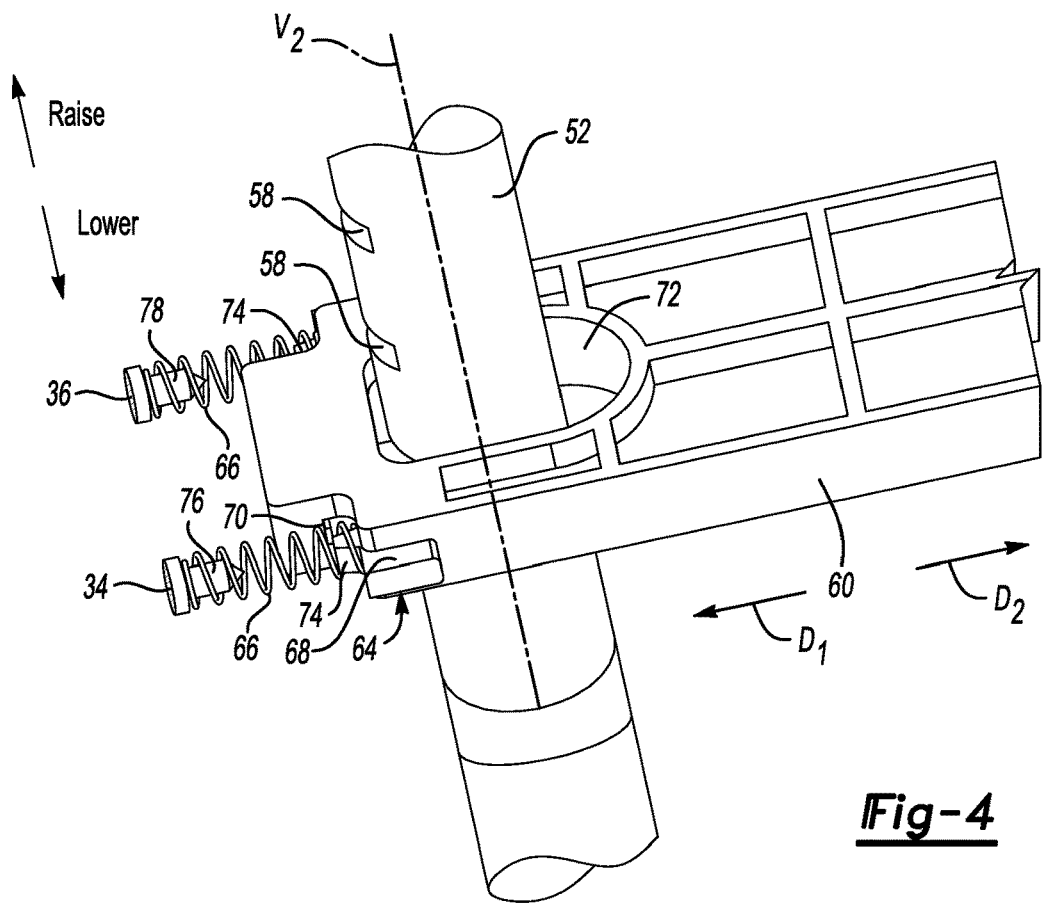
FIG. 4 is a close-up view of an example locking arrangement.

FIG. 4 illustrates an example locking arrangement in detail. FIG. 4 illustrates the detail of the locking portion 64 and the vertical portion 52, but it should be understood that this arrangement also applies to the locking portion 62 and the vertical portion 50. In FIG. 4, the locking portion 64 of the push plate 60 includes a plate 68. In one example, the plate 68 is a metallic plate and is formed separately from the push plate 60, which may be formed of plastic in one example. It should be understood, however, that this disclosure is not limited to any particular material types.

In this example, the plate 68 is received in a slot 70 of the push plate 60. The push plate 60 further includes a rod opening 72 sized to allow the plate 68 to selectively engage the recesses 58 and to allow movement of the push plate 60 in the directions $D_1$, $D_2$.

Further, in this example, the plate 68 includes a plurality of projections 74 for supporting an end of a biasing element 66. In this example, the biasing element 66 is a coil spring received over the projection 74. The biasing elements are also received, at an opposite end, over projections 76, 78 formed in the first and second covers 34, 36 respectively. While FIG. 4 illustrates one example locking arrangement, other arrangements come within the scope of this disclosure.

It should be understood that terms such as "vertical" and "horizontal" are used above with reference to the normal, upright position of a car seat in a vehicle. These terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A headrest assembly, comprising:
a rod configured to connect the headrest assembly to a seat back, the rod including a first vertical portion and a second vertical portion, the first and second vertical portions each having a plurality of recesses; and
a head restraint including a pushing plate having a first locking portion and a second locking portion, the first and second locking portions selectively engaging the recesses of the first and second vertical portions, respectively, to adjust a vertical position of the head restraint, wherein the pushing plate is biased toward an engaged position by a coil spring received over a projection of one of the first and second locking portions.

2. The headrest assembly as recited in claim 1, wherein the head restraint includes a push button configured to move the pushing plate when depressed.

3. The headrest assembly as recited in claim 2, wherein the pushing plate is moveable between the engaged position and a disengaged position by the push button.

4. The headrest assembly as recited in claim 3, wherein, in the engaged position, the first and second locking portions are engaged with the recesses of the first and second vertical portions to prevent a vertical adjustment of the head restraint.

5. The headrest assembly as recited in claim 4, wherein, in the disengaged position, the first and second locking portions are disengaged from the recesses of the first and second vertical portions to permit vertical adjustment of the head restraint.

6. The headrest assembly as recited in claim 3, wherein the pushing plate is moveable in a direction substantially perpendicular to the first and second vertical portions of the rod by the push button.

7. The headrest assembly as recited in claim 6, wherein the first and second locking portions are provided by first and second locking plates, respectively.

8. The headrest assembly as recited in claim 7, wherein the first and second locking portions are carried by the pushing plate.

9. The headrest assembly as recited in claim 1, wherein the head restraint includes a front cover configured to face a rear of a head or neck of an occupant when in use and a rear cover opposite the front cover, wherein the front and rear covers are connected together and provide an interior space therebetween, and wherein the pushing plate is provided entirely in the interior space.

10. The headrest assembly as recited in claim 9, wherein the front cover and the rear cover support a cushion and an encasement.

11. The headrest assembly as recited in claim 1, wherein:
the coil spring is a first coil spring and is received over a projection of the first locking portion, and
the headrest assembly includes a second coil spring received over a projection of the second locking portion.

12. The headrest assembly as recited in claim 11, wherein:
the headrest assembly includes a third coil spring received over another projection of the first locking portion,
the third coil spring is arranged adjacent an opposite end of the first locking portion as the first coil spring,
the headrest assembly includes a fourth coil spring received over another projection of the second locking portion, and
the fourth coil spring is arranged adjacent an opposite end of the second locking portion as the third coil spring.

13. The headrest assembly as recited in claim 12, wherein:
opposite the first and second locking portions, the first, second, third, and fourth coil springs are received over projections formed in either a front cover or a rear cover, and
the front cover and rear cover are configured to connect together to provide an interior space receiving an entirety of the pushing plate.

14. A seat for a motor vehicle, comprising:
a seat back; and
a headrest assembly, comprising:
a rod configured to connect the headrest assembly to the seat back, the rod including a first vertical portion and a second vertical portion, the first and second vertical portions each having a plurality of recesses; and
a head restraint including a pushing plate having a first locking portion and a second locking portion, the first and second locking portions selectively engaging the recesses of the first and second vertical portions, respectively, to adjust a vertical position of the head restraint, wherein the head restraint includes a front cover configured to face a rear of a head or neck of an occupant when in use and a rear cover opposite the front cover, wherein the front and rear covers are connected together and provide an interior space therebetween, wherein the pushing plate is provided entirely in the interior space, and wherein the pushing plate is biased toward an engaged position by a coil spring received over a projection of one of the first and second locking portions.

15. The seat as recited in claim 14, wherein:
the head restraint includes a push button configured to move the pushing plate when depressed,
the pushing plate is moveable in a direction substantially perpendicular to the first and second vertical portions by the push button, and
the pushing plate is biased toward the engaged position.

16. The seat as recited in claim 15, wherein the pushing plate is moveable between an engaged position and a disengaged position by the push button.

17. The seat as recited in claim 16, wherein:
in the engaged position, the first and second locking portions are engaged with the recesses of the first and second vertical portions to prevent vertical adjustment of the head restraint, and
in the disengaged position, the first and second locking portions are disengaged from the recesses of the first and second vertical portions to permit vertical adjustment of the head restraint.

18. The seat as recited in claim 17, wherein the first and second locking portions are provided by first and second locking plates, respectively.

19. The seat as recited in claim 18, wherein the coil spring is one of a plurality of coil springs configured to urge the pushing plate to the engaged position.

20. The seat as recited in claim 14, wherein the front cover and the rear cover support a cushion and an encasement.

* * * * *